United States Patent
Memory et al.

(10) Patent No.: US 6,964,296 B2
(45) Date of Patent: Nov. 15, 2005

(54) HEAT EXCHANGER

(75) Inventors: Stephen Memory, Kenosha, WI (US); Gregory Hughes, Milwaukee, WI (US); Winston Zhang, Kenosha, WI (US); C. James Rogers, Racine, WI (US); Craig Grohman, Muskego, WI (US); Edward Robinson, Caledonia, WI (US); Richard Mielke, Franksville, WI (US); Jonathan P. Wattelet, Gurnee, IL (US); Lawrence Gabbey, Racine, WI (US); Richard J. Trapp, Racine, WI (US)

(73) Assignee: Modine Manufacturing Company, Racine, WI (US)

(*) Notice: Subject to any disclaimer, the term of this patent is extended or adjusted under 35 U.S.C. 154(b) by 574 days.

(21) Appl. No.: 09/778,310

(22) Filed: Feb. 7, 2001

(65) Prior Publication Data

US 2002/0134537 A1 Sep. 26, 2002

(51) Int. Cl.$^7$ ............................................. F28D 1/04
(52) U.S. Cl. ................ 165/151; 165/143; 165/144; 165/148; 165/152; 165/153; 165/173; 165/177; 165/179; 165/181
(58) Field of Search ....................... 165/148, 151, 165/152, 153, 177, 140, 144, 143, 173, 179, 165/181

(56) References Cited

U.S. PATENT DOCUMENTS

| | | | |
|---|---|---|---|
| 1,950,500 A * | 3/1934 | Loprich et al. ............. | 165/152 |
| 1,993,872 A * | 3/1935 | Chase ......................... | 165/153 |
| 1,998,663 A * | 4/1935 | Emmons et al. ............ | 165/153 |
| 2,011,853 A * | 8/1935 | Emmons ...................... | 165/153 |
| 2,271,538 A | 2/1942 | Brace | |
| 2,427,336 A | 9/1947 | Askin | |
| 3,149,667 A * | 9/1964 | Astrup ..................... | 165/134.1 |
| 3,167,046 A | 1/1965 | Modine | |
| 3,411,196 A * | 11/1968 | Zehnder ................ | 29/890.043 |
| 3,687,194 A * | 8/1972 | Scholl ........................ | 165/180 |
| 3,771,595 A * | 11/1973 | Slaasted ..................... | 165/151 |
| 4,428,419 A * | 1/1984 | Dubrovsky et al. ......... | 165/151 |
| 4,465,129 A * | 8/1984 | Baldensperger et al. .... | 165/153 |
| 4,492,851 A * | 1/1985 | Carr .......................... | 219/201 |
| 4,586,563 A * | 5/1986 | Dubrovsky et al. ......... | 165/151 |
| 4,601,089 A * | 7/1986 | Gal ....................... | 29/890.042 |
| 5,000,257 A * | 3/1991 | Shinmura ................... | 165/140 |
| 5,033,540 A * | 7/1991 | Tategami et al. ........... | 165/135 |
| 5,048,602 A * | 9/1991 | Motohashi et al. ......... | 165/173 |
| 5,094,293 A * | 3/1992 | Shinmura ................... | 165/178 |

(Continued)

FOREIGN PATENT DOCUMENTS

DE          852249          10/1952

(Continued)

*Primary Examiner*—Henry Bennett
*Assistant Examiner*—Nihir Patel
(74) *Attorney, Agent, or Firm*—Wood, Phillips, Katz, Clark & Mortimer (57) ABSTRACT

Heat exchange inefficiencies found in round tube plate fin heat exchangers are eliminated in an aluminum heat exchanger that includes first and second headers (20), (22) and at least one flattened tube (24), (70) extending between the headers (20), (22). A plurality of generally parallel tube runs are defined and each has opposite edges. A plurality of plate fins (26), (50) are arranged in a stack and each has a plurality of open ended slots (34), one for each run of the tubes (24), (70). Each of the tube runs (24), (70) is nested within corresponding slots (26) and the fins (26), (50) with one of the edges (40) of the tube runs extending outwardly of the corresponding fin (34). The assembly is brazed together.

11 Claims, 5 Drawing Sheets

U.S. PATENT DOCUMENTS

| | | | | |
|---|---|---|---|---|
| 5,101,887 A | * | 4/1992 | Kado | 165/76 |
| 5,190,100 A | * | 3/1993 | Hoshino et al. | 165/146 |
| 5,236,045 A | * | 8/1993 | Janezich et al. | 165/183 |
| 5,246,064 A | * | 9/1993 | Hoshino et al. | 165/146 |
| 5,289,874 A | * | 3/1994 | Kadle et al. | 165/152 |
| 5,329,988 A | * | 7/1994 | Juger | 165/153 |
| 5,458,190 A | * | 10/1995 | Sasaki et al. | 165/110 |
| 5,467,816 A | * | 11/1995 | Larinoff | 165/151 |
| 5,482,112 A | * | 1/1996 | Sasaki et al. | 165/110 |
| 5,501,270 A | * | 3/1996 | Young et al. | 165/151 |
| 5,509,199 A | * | 4/1996 | Beamer et al. | 29/890.07 |
| 5,518,070 A | * | 5/1996 | Kato | 165/180 |
| 5,529,116 A | * | 6/1996 | Sasaki et al. | 165/144 |
| 5,617,916 A | * | 4/1997 | Shigenaka et al. | 165/184 |
| 5,622,220 A | * | 4/1997 | Park et al. | 165/153 |
| RE35,655 E | * | 11/1997 | Hoshino et al. | 165/146 |
| 5,743,328 A | * | 4/1998 | Sasaki et al. | 165/144 |
| 5,771,964 A | * | 6/1998 | Bae | 165/144 |
| 5,924,485 A | * | 7/1999 | Kobayashi et al. | 165/144 |
| 5,992,514 A | * | 11/1999 | Sugimoto et al. | 165/135 |
| 6,016,864 A | * | 1/2000 | Bae et al. | 165/144 |
| 6,021,846 A | * | 2/2000 | Sasaki et al. | 165/144 |
| 6,073,686 A | * | 6/2000 | Park et al. | 165/144 |
| 6,155,339 A | * | 12/2000 | Grapengater | 165/173 |
| 6,155,340 A | * | 12/2000 | Folkedal et al. | 165/175 |
| 6,176,303 B1 | * | 1/2001 | Kobayashi et al. | 165/175 |
| 6,189,604 B1 | * | 2/2001 | Yamauchi et al. | 165/140 |
| 6,273,184 B1 | * | 8/2001 | Nishishita | 165/140 |
| 6,286,590 B1 | * | 9/2001 | Park | 165/174 |
| 6,305,465 B1 | * | 10/2001 | Uchikawa et al. | 165/140 |
| 6,357,518 B1 | * | 3/2002 | Sugimoto et al. | 165/140 |
| 6,382,312 B2 | * | 5/2002 | Avequin et al. | 165/140 |
| 6,662,861 B2 | * | 12/2003 | Ozaki et al. | 165/140 |
| 6,745,827 B2 | * | 6/2004 | Lee et al. | 165/144 |

FOREIGN PATENT DOCUMENTS

| | | | | |
|---|---|---|---|---|
| EP | 0654645 | | 5/1995 | |
| JP | 03099193 | | 4/1991 | |
| JP | 05099581 | * | 4/1993 | F28F 00/132 |
| JP | 09079766 | | 3/1997 | |
| JP | 09280762 | | 10/1997 | |
| JP | 09310993 | | 12/1997 | |
| JP | 10062084 | | 3/1998 | |
| JP | 10089870 | | 4/1998 | |
| JP | 10339587 | | 12/1998 | |
| JP | 10339593 | | 12/1998 | |
| JP | 11108576 | | 4/1999 | |

* cited by examiner

HEAT EXCHANGER

FIELD OF THE INVENTION

This invention relates to heat exchangers, and more specifically, to a brazed aluminum plate fin heat exchanger.

BACKGROUND OF THE INVENTION

In heat exchangers that have a high aspect ratio (the ratio of width to height), it is frequently necessary to locate the tube runs in a generally horizontal plane to minimize cost. Typical of such heat exchangers are evaporators and condensers as may be found in the air conditioning systems of off-highway vehicles, air conditioning systems for recreational vehicles, and in truck refrigeration systems. Particularly when used as evaporators, conventional serpentine louvered fins coupled with horizontal tube placement provides problems with water drainage due to the hold up of water between the fins. That is to say, it is necessary in evaporator applications that provision be made to drain moisture condensing on heat exchanger parts to prevent freeze-up which would block air flow and drastically impede efficiency.

As a consequence of these and other considerations, high aspect ratio evaporators and other heat exchangers have historically been produced using round tube plate fin technology. The tubes are oriented horizontally and the plate fins vertically to allow water to drain down the fins, around the tubes and out through the bottom of the heat exchanger. However, when compared to brazed, parallel flow type heat exchangers, performance of round tube plate fin heat exchangers suffers in three main areas.

For one, the round tubes substantially occlude the frontal area of the heat exchanger through which air passes. As a consequence, poor air side heat transfer results.

A second problem is that mechanical bonds between the tubes and the plate fins conventionally employed in such heat exchangers are incapable of reliably providing intimate, good heat exchange contact between the tubes and the fins and as a result, poor fin-tube bonds frequently reduce heat transfer.

A third problem is that the use of round tubes requires relatively large fin heights (fin height being the length of the fin between the center lines of two adjacent tubes). These large effective fin heights result in poor fin efficiency.

Still another problem that has sometime occurred in heat exchangers generally is undesirably low air side area. The lack of sufficient area impedes heat transfer on the air side as a quick review of Fourier's law will readily show. Consequently, it would be desirable to increase air side surface area without increasing fin height to the point where poor fin efficiency results.

The present invention is directed to overcoming one or more of the above problems.

SUMMARY OF THE INVENTION

It is one principal object of the invention to provide a new and improved method of making a heat exchanger that eliminates fixturing requirements during a brazing process.

It is another principal object of the invention to provide a new and improved heat exchanger employing plate fins that are vertically arranged in a heat exchanger having horizontal tube runs, and specifically, such a heat exchanger where excellent bonding is provided between the tubes and the plate fins to avoid poor heat transfer at the interface between the tubes and the fins.

It is still a third principal object of the invention to provide a new and improved heat exchanger employing plate fins that maximizes air side area without undesirably increasing fin height so as to improve the efficiency of heat transfer on the air side of the heat exchanger.

An exemplary embodiment of the invention that achieves the first principal object mentioned above includes a method of fabricating a heat exchanger with the steps of:

a) providing a plurality of generally parallel tube runs of a flattened heat exchange tube having a major dimension and a minor dimension;

b) providing a plurality of plate fins, each having a plurality of tube slots approximately equal to the number of tube runs, each slot opening to an edge of the associated fin and having i) a shape corresponding to the cross-section shape of a tube run to be received in the slot, ii) a depth less than the major dimension of the tube run to be received in the tube slot, and iii) a width approximately equal to or slightly less than the minor dimension of the tube run to be received in the slot. The method further includes the steps of c) fitting the tube runs snugly into corresponding slots in each of the fins such that an edge of each tube run extends a distance beyond the ends of the slots in which it is received;

d) locating the assembly resulting from step c) on a supporting surface with the tube run edges in contact with the supporting surface and with the plate fins extending above the tube runs; and e) subjecting the assembly to an elevated temperature sufficient to braze the fins to the tube runs while the assembly is on the supporting surface and in the absence of brazing fixtures holding the fins on the tube runs in assembled relation.

In one embodiment, the tube runs are defined by straight sections of a serpentine tube while in another embodiment of the invention, the tube runs are each defined by straight pieces of tubing.

In one embodiment of the invention, the cross-section of the tube runs is a tear-drop shape while in another embodiment, the cross section of the tube runs is oval shaped.

According to the second principal object identified above, there is provided an aluminum heat exchanger which includes first and second headers and at least one flattened tube extending between and in fluid communication with the headers and defining a plurality of generally parallel tube runs in spaced relation to one another. Each of the tube runs has opposite edges defining a tube major dimension and interconnecting side walls defining a tube minor dimension and a plurality of interior ports. A plurality of plate fins are arranged in a stack and each has a plurality of open ended, tube run receiving slots, one for each tube run. Each slot has a shape generally that of the cross-section of the tube run to be received therein, a width equal or just less than the minor dimension of the corresponding tube run and a depth somewhat less than the major dimension of the corresponding tube run. Each of the tube runs is nested within corresponding slots in the fins with one of the edges of each tube run located outwardly of the corresponding fin. The headers, the tube runs and the fins make up a brazed assembly.

In one embodiment, the plate fins are elongated and the slots open to one elongated edge thereof. The other elongated edge of the plate fins are uninterrupted by the slots.

In one embodiment, a stiffening bead is located between the other elongated edge and the slots.

In still another embodiment, the plate fins are elongated and the slots open to both elongated edges of the fins.

In one such embodiment, the slots opening to one of the edges are aligned with slots opening to the other of the edges.

In one embodiment, the tube runs are defined by the legs of U-shaped tubes with one of the legs of each U-shaped tube being disposed in a slot opening to one elongated edge of the plate fin and the other leg being disposed in a slot opening to the other elongated edge of the plate fin.

In such an embodiment, it is preferred that each of the legs of each of the U-shaped tubes includes a 90° twist immediately adjacent the bight of the corresponding U-shaped tube.

According to the third of the objects identified above, there is provided a heat exchanger core that includes a plurality of generally parallel tube runs formed of flattened, multi-port tubing and a plurality of plate fins in stacked relation having spaced openings sufficient to receive the tube runs. The tube runs are disposed in the openings and have a major dimension brazed to the plate fins about the openings and the parts of the plate fins between the openings are arcuate in a direction generally transverse to the major dimension to thereby increase the surface area of the fins between the openings without the need to increase the spacing between adjacent openings.

In one embodiment, the openings in the plate fins are slots extending to the fins from one edge thereof.

Other objects and advantages will become apparent from the following specification taken in connection with the accompanying drawings.

DESCRIPTION OF THE PREFERRED EMBODIMENT

Exemplary embodiments of the invention will be described in connection with the drawings, frequently in the context of heat exchangers having horizontal tube runs and vertically extending plate fins. However, it is to be understood that no restriction to such orientation is intended except insofar as expressed in the claims. Similarly, while it is preferable that the components of the heat exchanger be of aluminum or aluminum alloy, various performance enhancing features of the invention, such as the use of arcuate plate fins, and/or the use of plate fins which are slotted and open to one side of the fin may be employed with efficacy in non-aluminum heat exchangers; and again, no restriction to aluminum heat exchangers is intended except insofar as expressed in the appended claims.

Figure 1:
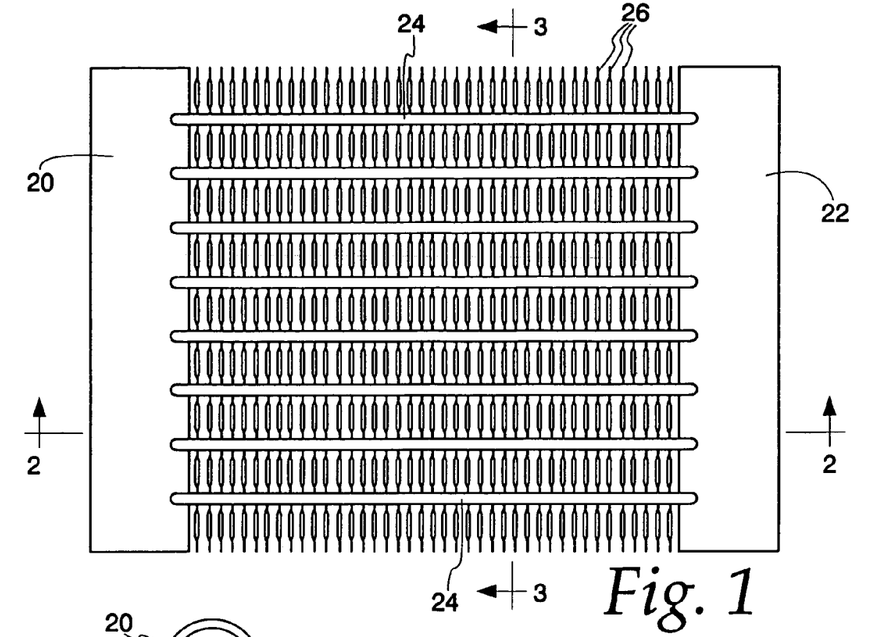
FIG. 1 is a side elevation of one embodiment of a heat exchanger made according to the invention.
Figure 2:
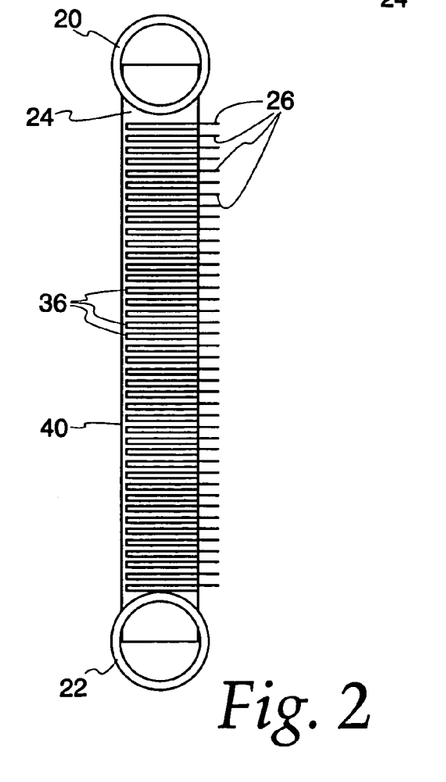
FIG. 2 is a sectional view of the embodiment of FIG. 1 taken approximately along the line 2—2 of FIG. 1.
Figure 3:
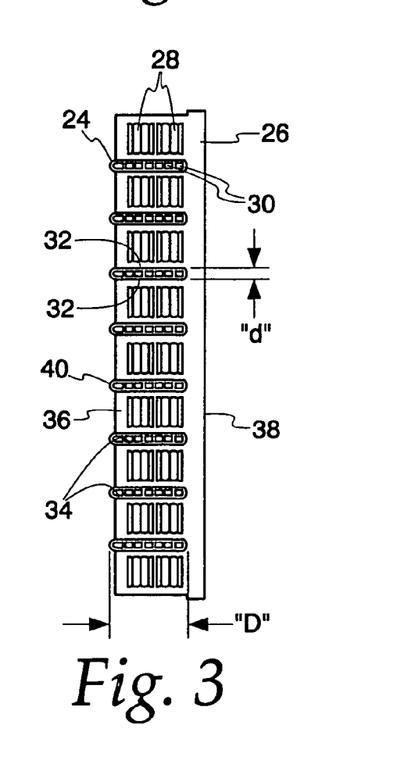
FIG. 3 is a sectional view of the embodiment of FIG. 1 taken approximately along the line 3—3 in FIG. 1.

A first embodiment of a heat exchanger made according to the invention is illustrated in FIGS. 1–3 and is seen to include a pair of vertically extending headers, 20, 22 that are parallel and spaced from one another. The headers 20, 22 preferably are hollow cylinders formed and welded from sheet aluminum or simply extruded, but could be multiple piece headers formed by welding or brazing if desired.

Flattened, multi-port tubes 24 formed as straight sections of individual pieces of tubing extend between and are in fluid communication with the headers 20, 22. The tubes 24 may be formed by extrusion or may be welded tubes provided with inserts.

Between the headers 20, 22 and fitted to the tubes 24 are a series of aluminum plate fins 26. In a typical embodiment, the density of the fins 26 will be about twenty fins per inch, although greater or lesser fin densities can be employed as desired.

Preferably, between each of the tube runs 24, the fins 26 contain a conventional pattern of louvers 28 as best shown in FIG. 3.

FIG. 3 also illustrates the tubes 24 as having multiple, internal ports 30. Typically, the hydraulic diameter of each of the ports will be no more than about 0.070" and even more preferably, will be 0.050" or less. However, higher hydraulic diameters can be used if efficiency is not of prime concern. The specific flattened tubes illustrated in FIG. 3 are in the form of flattened ovals having flat external side walls 32, the spacing between which is referred to conventionally as the tube minor dimension. This is illustrated as "d" in FIG. 3. The distance between the curved ends or edges of each of the tubes 24 is conventionally referred to as the tube major dimension, shown as "D" in FIG. 3.

The fins 26 are arranged in a stack as seen in FIGS. 1 and 2 and each fin in the stack has a series of slots 34 that open to one elongated edge 36 of the fin 26 in a direction generally normal to the edge 36. The opposite edge 38 of the fin 26, in the embodiment illustrated in FIGS. 1–3, is uninterrupted.

The slots 34 have a depth that is less than the tube major dimension, typically by an amount equal to about the radius of curvature of the rounded edges 40 of the tubes 24. The slots 34 otherwise have a shape corresponding to the cross-section of each of the tubes 24 but nominally ever so slightly smaller so as to assure that the edges of the slots 34 tightly embrace the side walls 32 of the tubes 24. That is to say, the width of the slots 34 is preferably ever so slightly less than the tube minor dimension "d".

When the tubes 24 are formed of aluminum, the headers 20, 22 and fins will also be formed of aluminum. Preferably, the headers 20, 22 and fins have an external cladding of braze alloy and the tubes 24 are extruded aluminum. Alternatively, the tubes 24 may be welded and have an external aluminum braze alloy cladding thereon so as to form tight, brazed joints with the headers 20, 22 and a good bond with the fins 26.

In assembling the heat exchanger illustrated in FIG. 1, the tubes 24 are inserted into aligned slots (not shown) in the headers 20, 22 and the stack of plate fins 26 applied thereto. Alternatively, the fins 26 may be applied to the tubes before application of the headers 20, 22. In any event, because of the relative dimensioning of the tubes 24 and the slots 34 as mentioned previously, the tube edges 40 will extend past the edges 36 of the fins 26. As a consequence of this, the core thus formed may be placed on a flat surface with the edges 40 of the tubes 24 in contact therewith for support. The same may be placed in a brazing oven (continuous or otherwise) and the temperature elevated to a brazing temperature. Because, in a typical construction, the fins 26 will be thinner than the walls of the tubes 24, as the fins 26 approach the melting temperature of the base metal and begin to soften, they will settle into the position illustrated in FIG. 3 through the action of gravity and without the need for any special fixturing to cause this result. Brazing will occur and upon cooling, the assembly will appear as in FIG. 3 with all of the fins 26 in the stack aligned with one another. The process not only avoids misalignment of the fins in the finished product which is unsightly, and thus undesirable, it eliminates the need for fixtures during the brazing process to hold the fins in place relative to the tubes, thereby considerably simplifying the manufacturing process.

Figure 4:
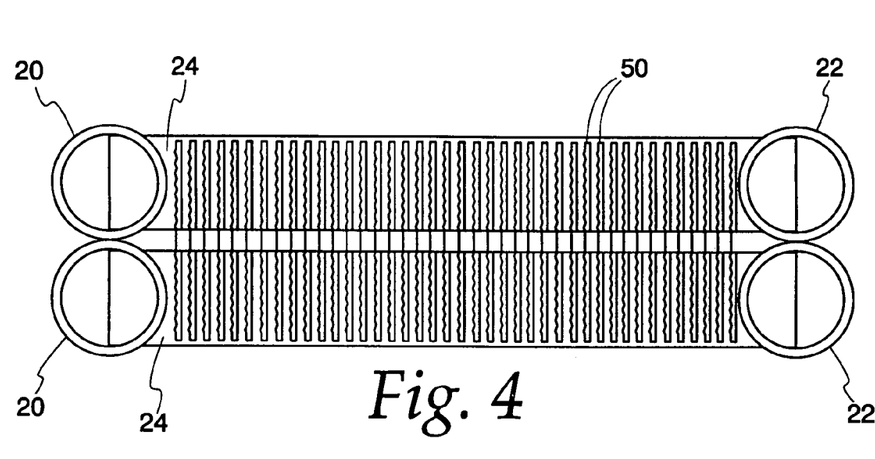
FIG. 4 is a view similar to FIG. 2 but of a modified embodiment of the invention.
Figure 5:
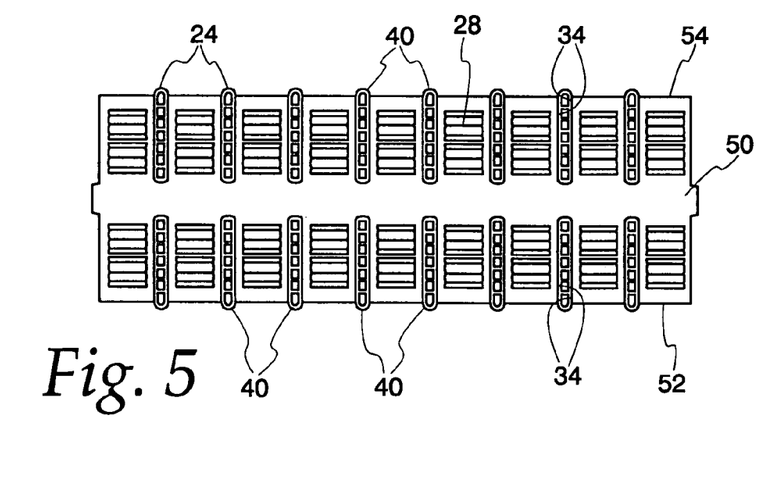
FIG. 5 is a view similar to FIG. 3 but of the embodiment illustrated in FIG. 4.

The embodiment illustrated in FIGS. 1–3, inclusive, illustrates a single tube row heat exchanger. FIGS. 4 and 5 show an embodiment that provides two tube rows in the heat exchanger. In the interest of brevity, identical components will not be redescribed and will be given the same reference numerals. In the embodiment illustrated in FIGS. 4 and 5, two each of the headers 20, 22 are employed, one for each tube row. Two rows of the tubes 24 are employed as well and a stack of plate fins 50 are utilized. In the embodiment illustrated in FIGS. 4 and 5, the slots 34 are formed in two rows, one opening generally normal to one edge 52 of the fin and the other row opening generally normal to the opposite edge 54 of the fins 50. The slots 34 are dimensioned with respect to the tubes 24 in the same manner mentioned previously and again are provided with louvers 28 between adjacent ones of the tubes 24. Fabrication is as mentioned previously and by suitable plumbing, the rows may be arranged in hydraulic parallel, in series, or may even be utilized to provide cooling for two different fluids if desired.

In some instances, two adjacent headers, such as the headers 20, may be replaced with a single larger header that receives the tubes 24 of both rows. In such a case, one of the headers 22 would be provided with an inlet while the other header 22 would be provided with an outlet.

Figure 6:
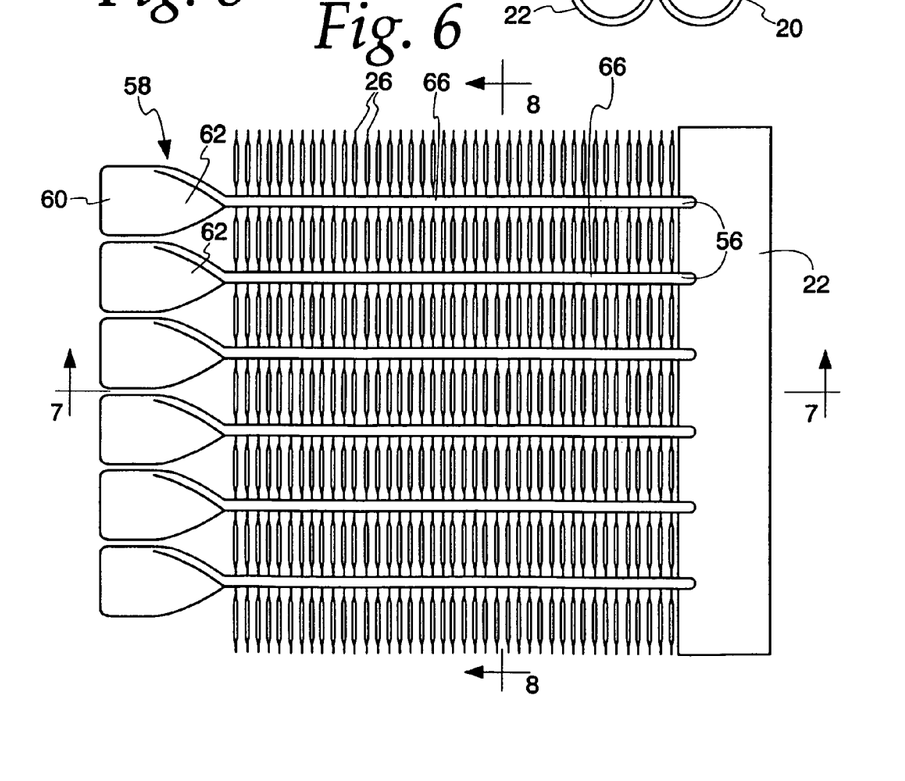
FIG. 6 is a side elevation of still another modified embodiment of the invention.
Figure 7:
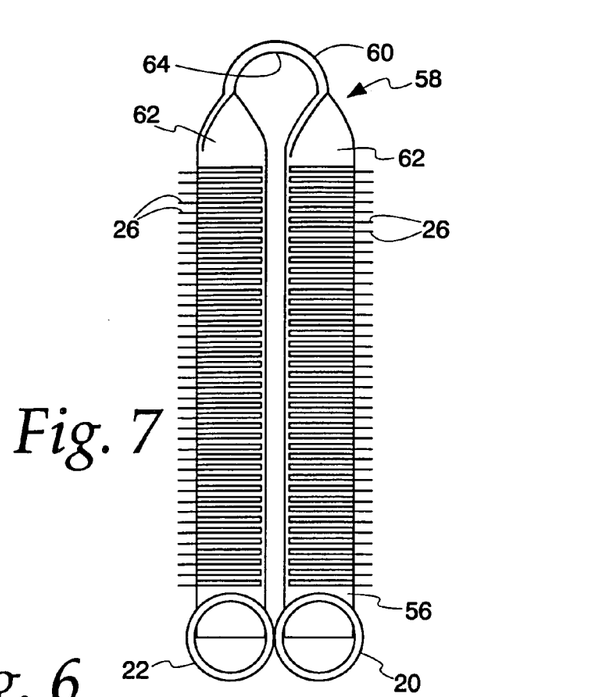
FIG. 7 is a sectional view taken approximately along the line 7—7 in FIG. 6.
Figure 8:
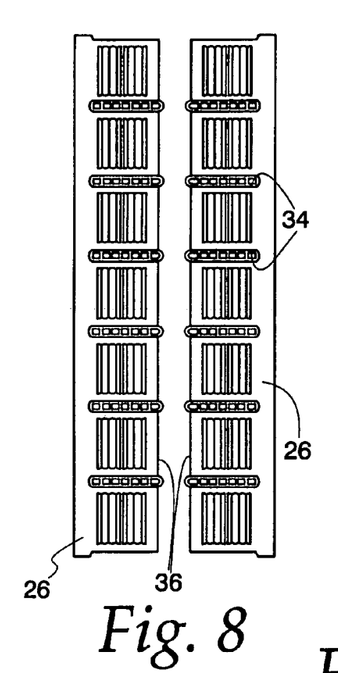
FIG. 8 is a sectional view taken approximately along the line 8—8 in FIG. 6.

Still another embodiment of the invention is illustrated in FIGS. 6–8, inclusive. In this embodiment, two tube rows are formed and they are connected in hydraulic series. Again, like components will not be redescribed in the interest of brevity and will be given the same reference numerals as those used previously. In the embodiment of FIGS. 6–8, a heat exchanger much like that illustrated in FIGS. 1–3 is formed using the fins 26 that are provided with slots 34 opening generally normal to only one edge 36 of the fins 26. In this embodiment, tubes 56 extend between the headers 20, 22. However, the tubes 56 are considerably longer than those illustrated in the embodiment of FIGS. 1–3 for a heat exchanger having the same frontal area and two stacks of the fins 26 are used. Each stack is abutted against a corresponding one of the headers 20, 22 leaving a gap, generally designated 58, in the center of the heat exchanger which is characterized by the absence of the fins.

Prior to assembling and brazing, the heat exchanger using the method mentioned previously, the center part 60 of each gap 58 is rotated up to and including 90° and relative to that part of each tube 56 and merging from each of the two stacks of fins 26 to form a bent section 62 closely adjacent to each of the stacks of the fins 26. The central section 60 of each gap 58 is free of a twist as illustrated in FIG. 7. The components are assembled and brazed, following which the two headers 20, 22 may be brought into contact with one another as illustrated in FIG. 7 to form a 180° arcuate section 64 between the two twists 62. Thus, the tubes 56 are U-shaped with legs 66 being straight and extending between the twists in a corresponding one of the headers 20, 22 and with the bight of the U being defined by the central section 60 of the gap 58 and defining the arcuate section 64.

While the embodiment shown in FIGS. 6–8 employs only two rows of the tubes, it will be appreciated that any desired number of rows of the tubes could be provided in the same fashion simply by increasing the number of gaps and providing twists 62 and bends 64 in each of the gaps 58. For example, a three row construction made according to the embodiment shown in FIGS. 6–8 would have three stacks of the fins 26 separated by two of the gaps 58.

Figures 9, 10, 11, 12, 13:
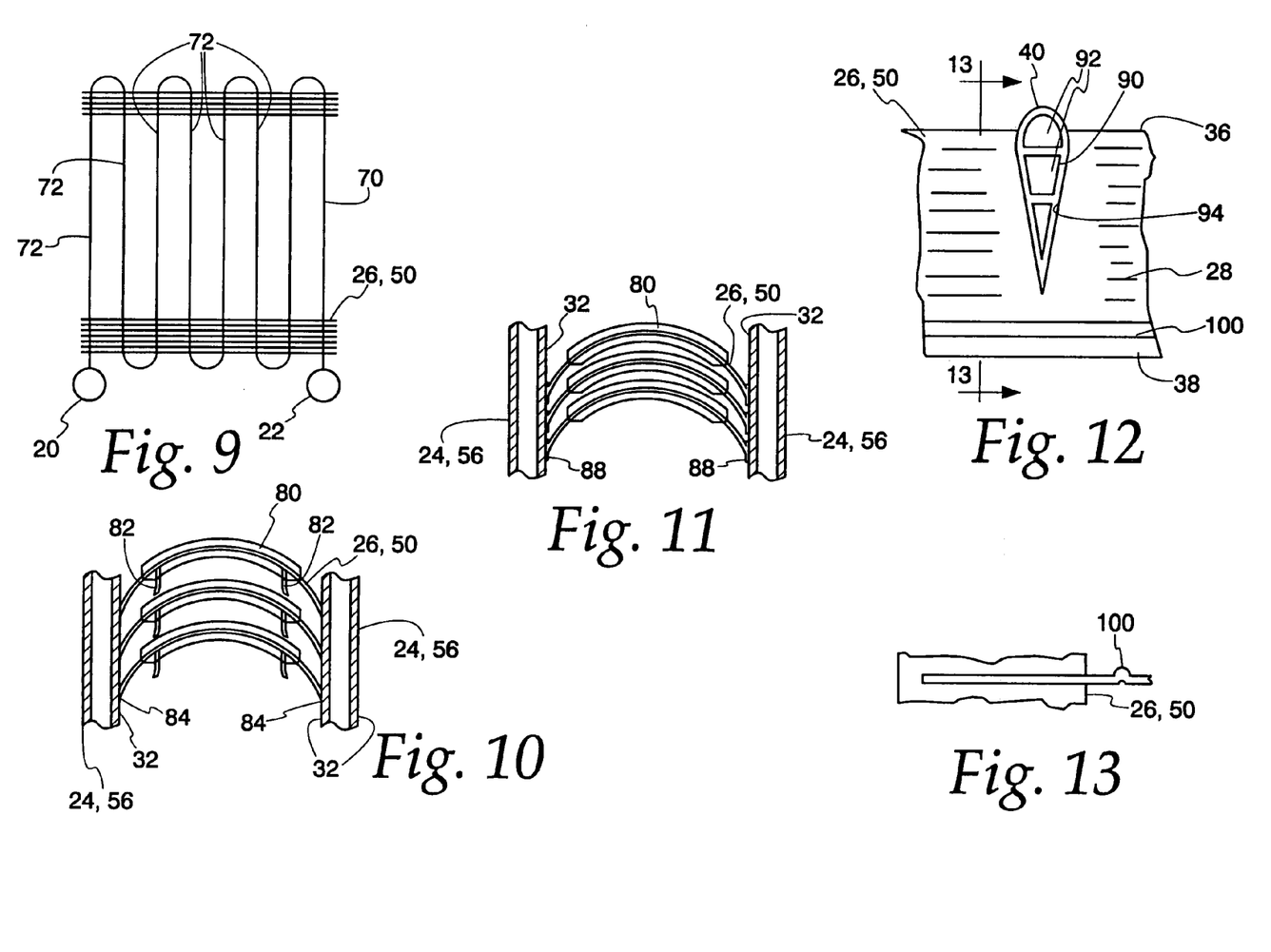
FIG. 9 is a somewhat schematic view of still another modified embodiment of the invention.
FIG. 10 is a fragmentary, sectional view of a highly preferred plate fin construction employed in any embodiment of the invention.
FIG. 11 is a view similar to FIG. 10 but of an optional, and somewhat less to preferred, embodiment of the plate fin.
FIG. 12 is a fragmentary, sectional view of the cross-section of an embodiment of the invention employing a tear-drop shaped tube.
FIG. 13 is a sectional view taken approximately along the line 13—13 in FIG. 12.

FIG. 9 illustrates still another embodiment of the invention. In this case, a single tube 70 is formed in serpentine fashion to have a plurality of straight runs, there being eight such runs illustrated in FIG. 9. Headers 20, 22 are located at the ends of the single tube 70 and the straight runs 72 fitted with fins such as the fins 26. Of course, if a two row heat exchanger according to FIG. 9 were intended, fins 50 employed in the embodiment of FIGS. 4 and 5 could be employed along with an additional one of the tubes 70.

FIG. 10 illustrates a highly preferred form of the fins 26, 50 utilized in the invention. The fins 26, 50 in this embodiment are arcuate as illustrated in FIG. 10 and include conventional louvers 80 along with spacing legs 82. The fin slots 34 (not shown) in FIG. 10 are free of flanges and abut the side walls 32 of the tubes 24, 56. At this point, during the brazing process, the edges 84 will form a good bond with the flat sides 32 of the tubes 24, 56 when the aforementioned process or a conventional brazing process is employed. It is of some interest to note that the fact that the fins 26, 50 are arcuate, provides a certain springiness or resilience to cause the edges 84 to be urged against the side walls 32. Moreover, the absence of flanges on the edges 84 increases the air side free flow area to contribute to an improved air side heat transfer coefficient.

FIG. 11 shows a somewhat less preferred embodiment of a fin 26, 50 that may be used in the invention. In this particular embodiment, extremely small flanges 88 border the slots 34 in the fins and abut the flat sides 32 of the tubes 24, 56.

Again, with the embodiment of FIG. 11, the fins 26, 50 are arcuate. The importance of this feature is that the arcuate fins increase the air side surface without increasing fin height, i.e., the same number of the tubes 24, 56 may be fitted into a given frontal area even while the air side surface area is increased through the use of the curved fins. Consequently, the increase in area improves heat transfer on the air side while nothing is lost on the second fluid side because the same number of tubes 24, 56 may be employed. Moreover, the length of the louvers is also increased, thereby increasing turbulence and heat transfer. It is to be noted that the air side performance of the embodiment of FIG. 10 is slightly greater than that of the embodiment of FIG. 11 and considerably better than that of tubes having conventionally sized flanges for the reason that such flanges reduce the available air side free flow area through the heat exchanger.

FIG. 12 shows another sort of flattened tube that may be employed in the invention. Specifically, the tube is a teardrop shaped tube 90 having multiple ports 92. Again, the slots 94 in the fins 26, 50 are such as to snugly receive the tube 90, i.e., the slots 94 as they have a depth somewhat less than the major dimension of the tube 90 and area shaped like the cross-section of the tube 90. In this embodiment, the width of the slot 94 can be made the same or again, just slightly smaller, than the minor dimension of the tube 90.

If desired, in the embodiment illustrated in FIG. 12, or in the other embodiments, one or more elongated stiffening ribs 100 extending the length of each of the fins 26, 50 can be employed. The stiffening rib is illustrated in both FIGS. 12 and 13. In the case of the embodiment of FIGS. 4 and 5, the stiffening rib would be located in the center of the fin, between the two rows of slots. In addition to the stiffening function, the ribs 100 enhance condensate drainage when the heat exchanger is used as an evaporator.

Though not shown in the drawings, in multiple tube row embodiments such as shown in FIGS. 4–8, the tubes in one row may be staggered with respect to the tubes in one or more other rows. Moreover, in some cases it may be desirable to have the tube major dimensions canted at some angle other than 90° with respect to the longitudinal axis of the fins.

Figure 14:
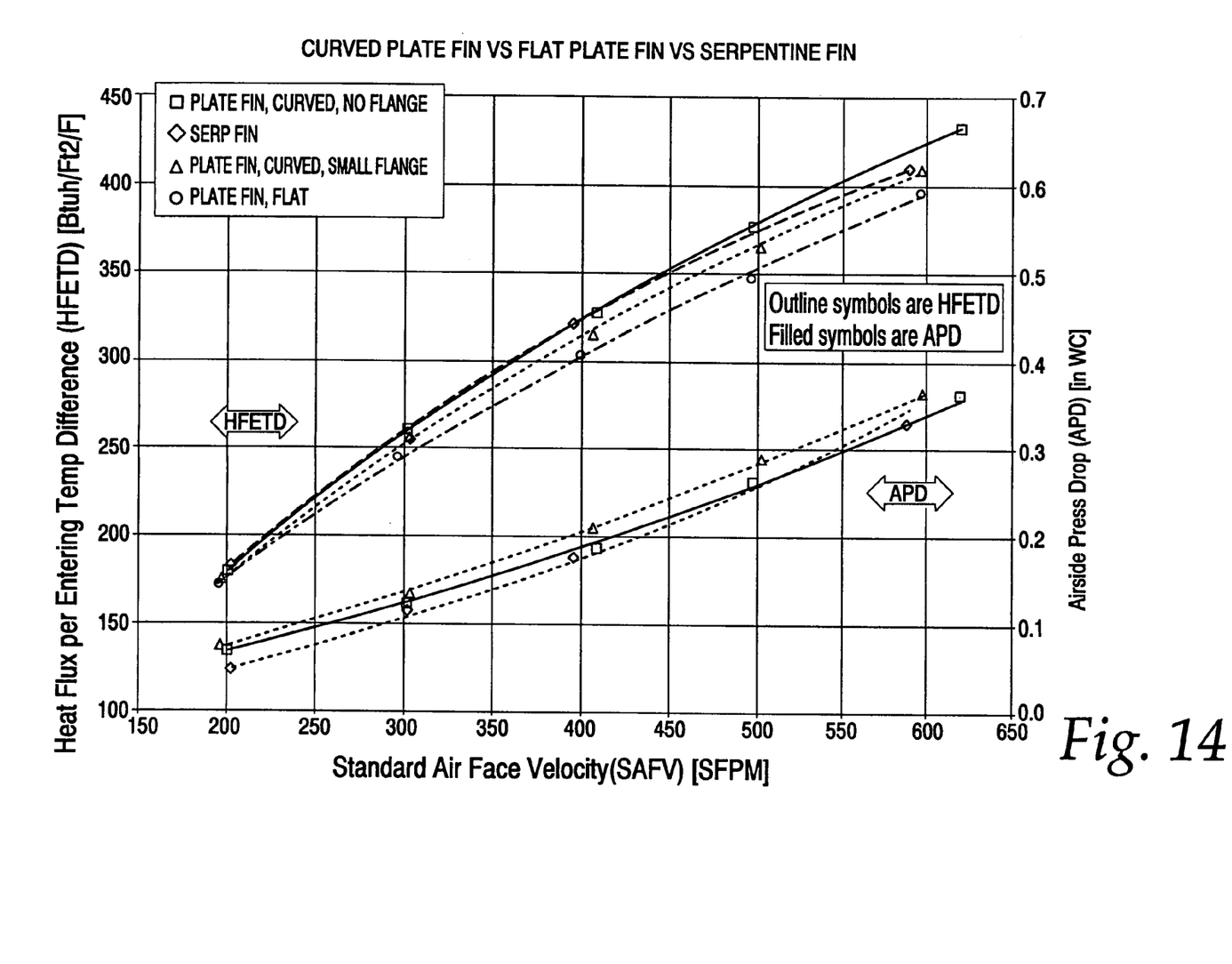
FIG. 14 is a graph showing the relative performance of four different types of fins, namely, a conventional serpentine fin construction, the plate fin of FIG. 10, the plate fin of FIG. 11 and a conventional flat plate fin construction, all utilizing flattened, multi-port tubes.

Turning now to FIG. 14, the same illustrates test results for various fin constructions, including the fin constructions illustrated in FIGS. 10 and 11. Standard air face velocity is plotted against a) heat flux for entering temperature difference in btu's per square foot per degree Fahrenheit and b) against air side pressure drop in inches of water. It will be appreciated that the curved fins of the invention compare favorably with conventional serpentine fins illustrating that the bonding problems incurred in plate fin heat exchangers are solved by the invention. It will be particularly noted that in the case of conventional, flat plate fin, heat exchange performance for fins made according to the invention possess a significant advantage. It will also be observed that the fin of FIG. 10 shows an advantage over the fin of FIG. 11 both in terms of heat transfer and in terms of providing a lesser air side pressure drop.

The invention provides a heat exchanger that eliminates round tubes which provide a high drag, i.e., increase air side pressure drop and eliminates mechanical bonds typically found in such heat exchangers. Furthermore, the invention allows the use of relatively small fin heights to avoid a loss of efficiency that occurs with large fin heights. While the heat exchanger of the invention is suited for many different applications, it is particularly used with advantage as an evaporator in that the use of vertical plate fins with stiffening ribs and gaps between the tubes provide for excellent drainage of condensation that conventionally occurs in evaporators used in refrigeration or air conditioning systems.

Manufacturing is simplified in that the fins 26 on the one hand and 50 on the other may be made with the same die simply by repeating the stamping operation on both sides of a wider fin. Furthermore, the unique advantage provided by allowing the rounded edges 40 of the tubes to extend slightly past the edges 36, 52, 54 of the fins permits brazing of the components without the use of brazing fixtures designed to locate the fins in a common plane.

The use of curved fins increases the air side surface area without necessitating an increase in fin height and provides an additional advantage of inherent resilience causing the edges of the slots in the fins to tightly embrace the side walls 32 of the tubes to further assure a good bond during brazing.

We claim:
1. An aluminum heat exchanger, comprising:
first and second headers;
at least one flattened tube extending between and in fluid communication with said headers and defining a plurality of generally parallel tube runs in spaced relation to one another;
each said tube runs having opposite edges defining a tube major dimension and interconnecting side walls defining a tube minor dimension and a plurality of interior ports;
a plurality of plate fins arranged in a stack and each having a plurality of open ended tube run receiving slots, one for each tube run, each slot having a shape generally that of the cross-section of the tube run to be received therein, a width equal to or just less than the minor dimension of the corresponding tube run and a depth somewhat less than the major dimension of the corresponding tube run;
each said tube run being nested within corresponding slots in said fins with one of said side walls of each tube run located outwardly of the slots in which it is received; and
said headers, said tube runs and said fins comprising a brazed assembly;
wherein said fins are curved at locations between said slots.

2. An aluminum heat exchanger, comprising:
first and second headers;
at least one flattened tube extending between and in fluid communication with said headers and defining a plurality of generally parallel tube runs in spaced relation to one another;
each said tube runs having opposite edges defining a tube major dimension and interconnecting side walls defining a tube minor dimension and a plurality of interior ports;
a plurality of plate fins arranged in a stack and each having a plurality of open ended tube run receiving slots, one for each tube run, each slot having a shape generally that of the cross-section of the tube run to be received therein, a width equal to or just less than the minor dimension of the corresponding tube run and a depth somewhat less than the major dimension of the corresponding tube run;
each said tube run being nested within corresponding slots in said fins with one of said side walls of each tube run located outwardly of the slots in which it is received;
said headers, said tube runs and said fins comprising a brazed assembly;
wherein said plate fins are elongated and said slots open to one elongated edge thereof, the other elongated edge being uninterrupted by said slots; and
further comprising a stiffening bead between said other elongated edge and said slots.

3. The heat exchanger of claim 1 wherein said plate fins are elongated and said slots open to both elongated edges thereof.

4. The heat exchanger of claim 3 wherein the slots opening to one of said elongated edges are aligned with the slots opening to the other of said elongated edges.

5. The heat exchanger of claim 3 including an elongated uninterrupted band extending in the direction of elongation of said plate fins located between the slots opening to said one elongated edge and the slots opening to said other elongated edge.

6. The heat exchanger of claim 3 wherein said tube runs are defined by the legs of U-shaped tubes, one of said legs of each U-shaped tube being disposed in a slot opening to one elongated edge of said plate fin and the other leg being disposed in a slot opening to the other elongated edge.

7. The heat exchanger of claim 6 wherein the slots opening to opposite ones of said elongated edges are aligned and the legs of each said U-shaped tube are located in aligned ones of said slots.

8. The heat exchanger of claim 7 wherein each of said legs of each of said U-shaped tubes includes an angled twist of an angle up to and including 90° immediately adjacent the bight of the corresponding U-shaped tube.

9. A heat exchanger core comprising:
a plurality of generally parallel tube runs formed of flattened, multi-port tubing; and
a plurality of plate fins in a stacked relation and having spaced openings sufficient to receive said tube runs;
said tube runs being disposed in said openings and having a major dimension brazed to the plate fins about said openings;
the parts of said plate fins between the openings being arcuate in a direction generally transverse to said major dimension to thereby increase the surface area of the fins between the openings without the need to increase the spacing between adjacent openings.

10. The heat exchanger of claim 9 wherein said openings are slots extending into the fins from one edge thereof.

11. An aluminum heat exchanger, comprising:
first and second headers;
at least one flattened tube extending between and in fluid communication with said headers and defining a plurality of generally parallel tube runs in spaced relation to one another;
each said tube runs having opposite edges defining a tube major dimension and interconnecting side walls defining a tube minor dimension and a plurality of interior ports;
a plurality of plate fins arranged in a stack and each having a plurality of open ended tube run receiving slots, one for each tube run, each slot having a shape generally that of the cross-section of the tube run to be received therein, a width equal to or just less than the minor dimension of the corresponding tube run and a depth somewhat less than the major dimension of the corresponding tube run;
each said tube run being nested within corresponding slots in said fins with one of said side walls of each tube run located outwardly of the slots in which it is received; and
said headers, said tube runs and said fins comprising a brazed assembly;
wherein said slots have flange free edges brazed to said tube runs;
wherein said fins are curved at locations between said slots.

* * * * *